Figure 2:
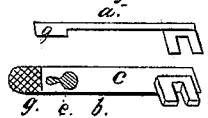
Figure 1:
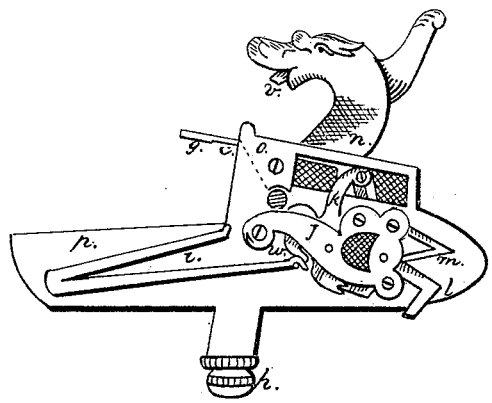
Figure 3:
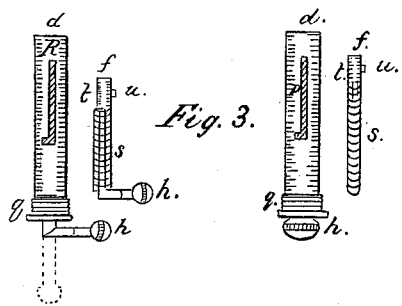

UNITED STATES PATENT OFFICE.

ROBERT BROWN, OF NEW LONDON, CONNECTICUT.

IMPROVEMENT IN PROJECTILES FOR KILLING WHALES.

Specification forming part of Letters Patent No. 24,371, dated June 14, 1859.

*To all whom it may concern:*

Be it known that I, ROBERT BROWN, of New London, State of Connecticut, residing at the Sandwich Islands, have invented a new and Improved Harpoon-Bomb; and I do hereby declare that the following is a full and exact description thereof, reference being had to the accompanying drawing, and to letters of reference marked thereon.

The nature of my invention consists of the flukes working on a pivot on the shank of the bomb supported by the ribs, and a projecture on the flukes inserted in the flange that fits against the barrel of the bomb. When screwed together lines rove through the ribs on the shank at the lower or wad end, with a groove or indentation along the bomb for the line, that it may be inserted into the gun with the bomb, and at the explosion of the bomb leave the shank in as a harpoon, with the line attached in the whale.

A are the flukes; A, flukes attached to shank; B, the mode of the line along the bomb; B, the groove or indentation along the bomb.

What I claim as my invention in the harpoon-bomb, and desire to secure by Letters Patent, is—

The flukes on the shank of the bomb, the line attached thereto, and the groove or indentation in the barrel of the bomb for the line, as above stated.

ROBERT BROWN.

Witnesses:
FRED. S. HANKS,
WM. INGRAHAM.

BUTTERFIELD & MARSHALL.
Gun-Lock.

No. 24,372.

Patented June 14, 1859.

Witnesses.
J. B. Butterfield
Harry A. Fordney

Inventor.
J. C. Butterfield